Dec. 2, 1969  H. BRANDT  3,481,115
WET-TYPE DUST PRECIPITATORS
Filed May 7, 1968  2 Sheets-Sheet 1

INVENTOR
HERBERT BRANDT
By
Jacobs & Jacobs

Dec. 2, 1969    H. BRANDT    3,481,115
WET-TYPE DUST PRECIPITATORS
Filed May 7, 1968    2 Sheets-Sheet 2

INVENTOR
HERBERT BRANDT
By Jacobi & Jacobi

United States Patent Office 3,481,115
Patented Dec. 2, 1969

3,481,115
WET-TYPE DUST PRECIPITATORS
Herbert Brandt, Vahlberg, 5961 Rothemühle uber
Olpe, Westphalia, Germany
Filed May 7, 1968, Ser. No. 727,206
Int. Cl. B01d 47/02
U.S. Cl. 55—233                                     5 Claims

ABSTRACT OF THE DISCLOSURE

A wet dust precipitator including one or more perforated plates disposed above a water vessel and onto which water is lifted by gas pressure for contact with upflowing gases, wall means in said vessel forming a sludge settling chamber, and sludge removal means.

---

Figure 1:
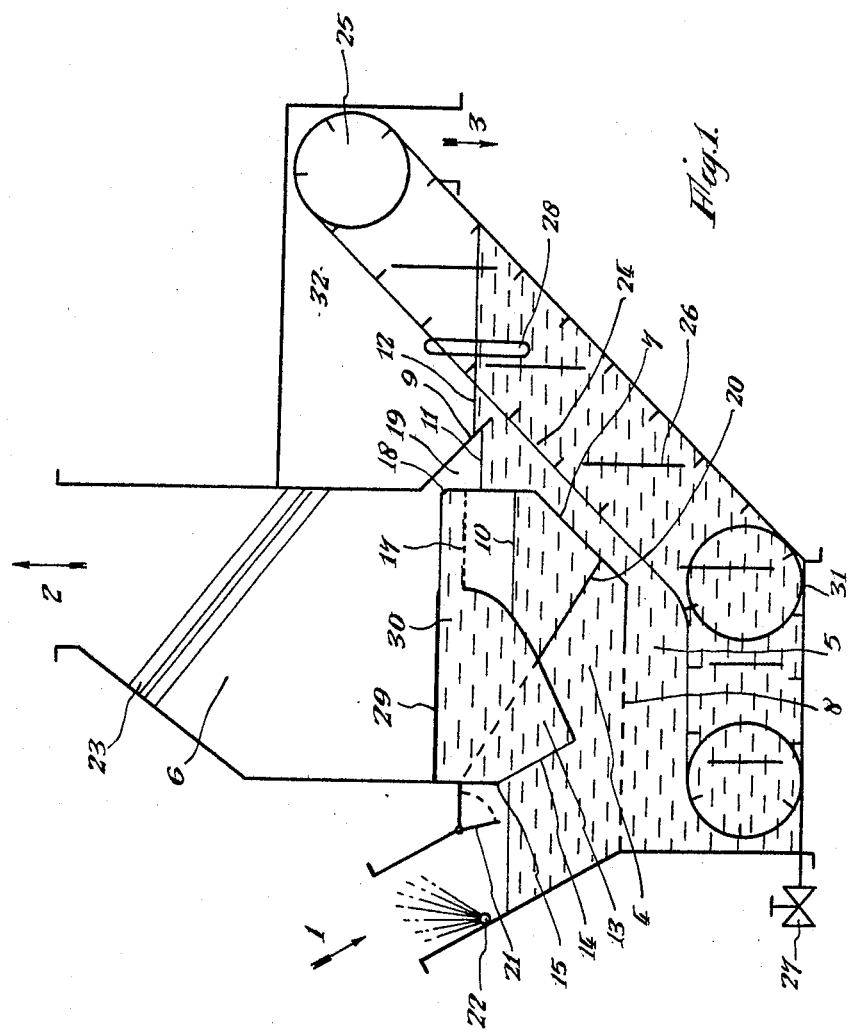

This invention relates to wet dust precipitators for precipitating fine dust from flowing gases.

The efficiency of wet dust precipitators depends fundamentally on the degree of success in wetting the dust particles which are entrained in the gas flow. Good contact between dust and water surfaces must therefore be provided. Said contact will be improved, the higher the velocity of the dust-laden gas relative to the water and the greater the water surface area. The water surface area can be increased by substantial atomisation of the water particles in the gas or by substantial diminution of the gas bubbles in the water, the increase in the surface area of the water being limited by the forces due to surface tension which practically preclude the diminution of droplets in gas or gas bubbles in the water below a certain limit. Accordingly, every effort is made to provide lively contact. This may be done for example by arranging for the stream of gas to strike a water surface with high velocity and by guiding said stream with various deflections and while entraining water into a fixed path.

In other designs the gas to be cleaned is ducted through a contact bed comprising wet beads or foam. Both systems may also be combined in an embodiment in which a contact stratum is disposed above the water surface on to which the stream of gas impinges. In this construction the stream of gas must entrain the water required to form the contact stratum. Since this is usually not possible to a sufficient degree, additional riser pipes are provided which extend from the water reservoir through the contact stratum. These pipes utilise the positive pressure prevailing below the contact stratum and which is equal to the flow resistance of the gas through the contact stratum in order to thrust the water from the water reservoir upwardly into the contact stratum. Return pipes are disposed in the contact stratum to achieve a controlled return flow and for returning the polluted water into the gas space above the water surface.

Although this system already employs the idea of water circulation, its effect is still imperfect because the polluted water drained off from the contact stratum is pushed back through the riser pipes into the contact stratum and settlement of the sludge must proceed in the water space which is substantially agitated by the impinging gas stream. Moreover, the height at which the contact stratum is disposed above the water surface is limited by the positive pressure of the gas which is used for thrusting upward of the water. This positive pressure represents an energy loss which loads the fan. The low height at which the contact stratum must therefore be disposed above the water surface limits the cross-sectional area through which the stream of gas can flow below the contact stratum. Inflow in this system is not only frontal but also lateral into the space below the contact stratum in order to increase the gas flow rate. The all-round inflow however includes ineffective deflections and resistances and prevents adequate utilisation of the manner in which the incoming gas strikes the surface. The construction of such a dust precipitator is therefore less economical and it is less effective. Above all, the manner in which the gas has to be ducted prevents width development of the dust precipitator for larger throughput rates, because the entry cross-section increases only linearly at the circumference, while the cross-sectional surface area of the contact bed is proportional to the square of its width.

It is the object of the invention to substantially increase the circulating velocity of the less polluted water and at the same time to substantially inhibit circulation of the more extensively polluted water proportion in a wet dust precipitator in which the gas stream impinges on a water surface, is then deflected while entraining water, and is ducted through a contact stratum disposed above the water surface.

According to the invention, this problem is solved in that an increased water circulation through two chambers is effected by means of one or more air lift pumps. The less polluted water together with the fresh make-up water is separated, by means of walls in the first chamber into which the crude gases enter, from the more extensively polluted water in the settling chamber. The air lift pump is in each case constructed as a pocket which extends to below the water surface of the first chamber and has above the water surface only a low entry height for a certain amount of gas whose buoyancy in the up-thrust and entrained water effects delivery. The water returns from the contact stratum, polluted by the absorption of dust, through overflow troughs which surround the contact bed, said water then passing into the second chamber which serves as a settling chamber. The water content of said settling chamber is undisturbed on the gas entry side by virtue of its separation from the gas entry chamber, the settling process proceeding without interruption in said water content. The separating wall between the gas entry chamber and the settling chamber is partially constructed as a perforated wall on that side which is opposite to the return flow in order to permit the return of the water from the settling chamber into the gas entry chamber. Sludge delivery from the settling chamber is effected in the usual manner by means of a scraper belt. The scraper belt is provided within its confines with vertical bulkheads which are so arranged that they separate the return flow of the water from the settling chamber to the gas entry chamber from the lower part of the settling chamber in order to assist settling of the sludge.

Where sludge is discharged through a free aperture to atmosphere a bulkhead is disposed between the settling chamber and the discharge aperture to seal the gas chamber relative to the discharge opening.

The invention further provides that a pivotable and lockable flap be disposed in the gas entry duct to enable the flow cross-section above the water surface of the incoming gas stream to be varied. This flap has two functions. When lightly loaded, appropriate adjustment of said flap enables the impact velocity of the gas on the water surface to be maintained at the same level as at full loading, so that the dust precipitation rate of the system is independent of loading. Furthermore, and in accordance with the available resistance of the gas in the wet dust precipitating system, it is possible for the flap to be set to a greater or lesser degree to provide a higher or lower dust precipitation rate. The flap can therefore be used to adjust the optimum dust precipitation rate according to the available energy.

Dust can be precipitated from hot gases only if the gas temperature is lowered below the boiling point of the water so that the dust can take up water in its liquid state. Dust precipitation commences only after the aforementioned cooling. It is therefore furthermore proposed that the fresh water for wetting the incoming crude gases be sprayed into the gas entry duct by means of nozzles before the incoming gases strike the water surface. The aforementioned fresh water is also required to replace water losses resulting from water evaporation and the proportion of water discharged with the wet sludge.

Figure 2:
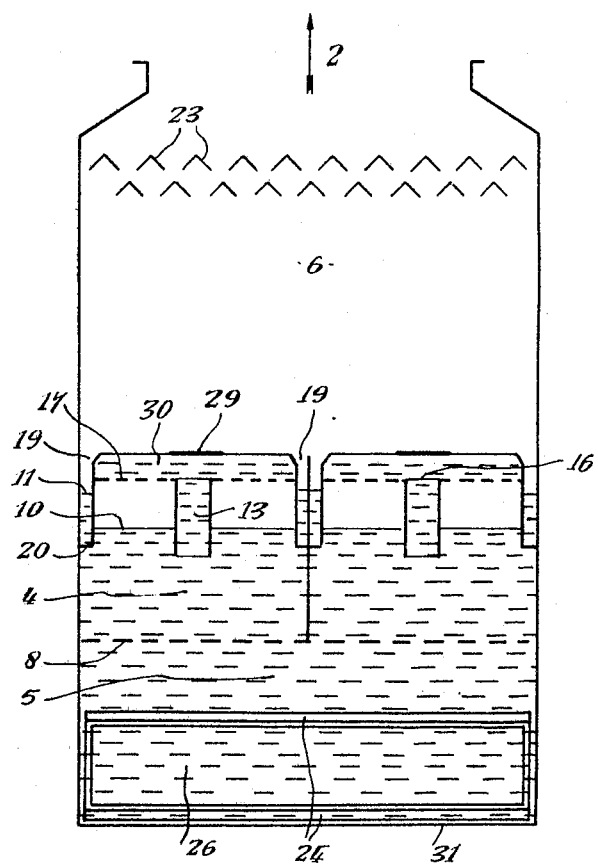

One embodiment of a wet dust precipitation plant according to the present invention is shown in the accompanying drawings, wherein:

FIG. 1 is a longitudinal section, and
FIG. 2 is a cross-section.

As shown in FIG. 1, crude gases enter, in the direction of the arrow 1, into an entry chamber 4, and initially flow through a curtain of fresh water which is sprayed against the gas stream from water nozzles 22 disposed in the entry duct. This initially provides the necessary cooling and saturation of the gases. The gas stream is then guided by an adjustable deflection flap 21 into the entry chamber 4, while coming into intensive physical contact with the surface 10 of the water in the chamber 4. After being upwardly deflected, the gas flow passes through a perforated plate 17 into a foamy contact bath 30, the plate 17 being disposed horizontally above the water surface 10, and thence into a gas chamber 6 and enters a purified gas discharge duct 2 by way of droplet collecting means 23.

Water circulation from the entry chamber 4 into the foam bath 30 is substantially effected by means of a partial gas flow through pump pockets 13. Said partial gas flow delivers the water upwardly through that part 15 of the pocket entry openings which is disposed above the water surface 10 and partially also through that part 14 of the pocket entry openings which is disposed below the said water surface, and with the cooperation of its kinetic energy and the buoyancy effect of its gas bubbles in the water bath. Cover plates 29 are disposed above the pocket discharge openings 16 in the horizontal perforated plate 17 in order to prevent the water surge from the pump pockets 13 splashing at too high a level into the gas chamber. The water delivered upwardly from the entry chamber 4 is therefore distributed to all sides over the perforated plate 17. Excess water in the bath 30, having absorbed dust, flows over the rear upper edge 18 of the entry chamber 4 and through overflow troughs 19 into a settling chamber 5. The overflow troughs 19 are separated from the entry chamber 4 by the plates 20 which are inclined at an angle. Separating walls 7 and 8 are disposed between the settling chamber 5 and the entry chamber 4. The frontal, horizontally extending part of the separating wall 8 is perforated so that the water, clarified after settling of a substantial proportion of the dust, can return through the perforated portion of the wall 8 into the entry chamber 4. The settled sludge is delivered by an endless scraper belt 24, operated by a drive shaft 25, over the floor 31 of the settling chamber 5 in the upward direction out of the water bath to a sludge discharge opening 3. A bulkhead 9, disposed above the settling chamber 5, separates air chamber 32 from the gas chamber 6. The air chamber 32 is open to the sludge discharge opening 3.

The water level of the entry chamber 4 is shown at 10, that of the settling chamber 5 at 11, and that of the air chamber 32 at 12. The water level 11 is higher than the water level 10 by an amount equivalent to the pressure resistance of the gases which pass through the perforated plate 17 and the foam bath 30. The water level 12 is shown higher than the water level 11 in FIG. 1, because the delivery side of the wet dust precipitation system is connected to a fan so that the internal pressure in the wet dust precipitator is higher than atmospheric pressure. This positive pressure is equal to the gas resistance in the ducts or flue which adjoin the gas discharge 2. If the dust precipitator is connected on the suction side to the fan it will have an internal negative pressure, and the water level 11 would be higher than the water level 12. The apparatus also has a discharge valve 27 and a water level indicator 28. The discharge valve 27 is used only for emptying the wet dust precipitator when it is not in use or for cleaning same. The water level indicator 28 is observed continuously, and the supply of fresh water through the nozzles 22 is so regulated that the water level in the sight-glass of the indicator 28 remains substantially unchanged.

To assist sedimentation of the dust sludge in the settling chamber 5, bulkheads 26 are provided between the runs of the scraper belt 24 to ensure that water agitation within the confines of the scraper belt 24 is substantially prevented. FIG. 2 shows two structural units disposed side-by-side.

A desired plurality of structural units may be disposed adjacently to enable a wet dust precipitation plant to be designed for any desired capacity, since the gas flows only frontally under the contact stratum.

The illustrated exemplified embodiment can be modified in different ways by maintaining the principle of water pumping, in particular by employing other sludge delivery means or in special cases involving the precipitation of large amounts of dust, by repumping the water between the settling chamber 5 and the entry chamber 4 by way of large settling tanks disposed outside the dust precipitation plant.

The separation of the less polluted water proportion with the added fresh water in the gas entry chamber 4 from the more heavily polluted water in the actual setting chamber 5, and the increased rate of water circulation through the air lift pumps which are provided in accordance with the invention, offer a substantial advance relative to known systems owing to the fact that a greater proportion of less polluted water is agitated by the inflowing crude gases, while the water, enriched with impurities, is kept away from gas agitation in the separated settling chamber 5. At the same time, water agitation in the settling chamber 5 is substantially prevented by the bulkheads 26.

Owing to the increased circulation of clean water, the water surface area available in unit time for contact with the crude gases is substantially enlarged, and the dust precipitation effect is correspondingly increased.

The adjustability of a uniform impact velocity with which the incoming crude gases strike the water surface under conditions of variable gas loading, by means of the gas deflection flap 21 provided in accordance with the invention, is another advantage.

The facilities for increasing the gas throughput of the plant to any desired level is another design advantage made possible by the parallel connection of a plurality of units according to the invention and constructed in identical manner and made possible by the fact that the inflow of crude gas takes place from only one side

What I claim and desire to secure by Letters Patent is:

1. A wet dust precipitator, with means for water circulation, comprising a gas entry chamber, with a frontal gas inflow duct, into which gas entry chamber the gases to be purified are introduced at an angle from above, and a water vessel disposed below the gas entry chamber with known sludge delivery means, said water vessel being filled with water to an adjustable level and over whose water surface one or more horizontally extending perforated plates are disposed in one plane to function as the upper boundary of the gas entry chamber and serving as the bottom plate of a contact chamber within which a turbulent water foam stratum is formed above which an upper purified gas chamber adjoins, and in which purified gas chamber known droplet collectors are incorporated and through which purified gases pass on their passage to an upper discharge opening, characterised in that a pocket-shaped supply duct, through which part of the gas delivers the less polluted water proportion upwardly from the gas entry chamber in the manner of an air lift pump, emerges in the perforated bottom plate of the contact chamber, and a horizontal cover plate is disposed at a distance above the said emerging position, said cover plate having the dimensions of the emerging opening of the supply duct and on to which cover plate impinges the less polluted water which is upwardly and centrally delivered into the contact chamber an, being uniformly distributed thereat, is discharged to all sides and overflow troughs and a rear overflow edge are provide on the circumference of each contact chamber, the more heavily polluted water of the turbulent water foam stratum flowing from said troughs and edges respectively into a sludge settling chamber which is separated by imperforate walls and a perforated wall from the vas entry chamber, said perforated wall being disposed on that side of the gas entry chamber which is opposite to the sludge discharge to effect water circulation from the entry chamber by way of the contact stratum and the settling chamber back into the entry chamber.

2. A wet dust precipitator according to claim 1, characterised in that a pivotable, lockable flap is disposed in the gas entry duct, said flap being adapted to deflect the gas stream to a greater or lesser extent on to the water surface.

3. A wet dust precipitator according to claim 1, characterised in that a bulkhead which extends to below the water surface is so disposed in the settling chamber that it separates the open sludge discharge from the gas chamber.

4. A wet dust precipitator according to claim 1, characterised in that stationary vertical bulkheads are disposed within the confines of a sludge delivery belt disposed in the settling chamber.

5. A wet dust precipitator according to claim 1, characterised in that nozzles are disposed on the gas entry duct for spraying atomised make-up water at an angle against the inflowing hot gases.

References Cited

UNITED STATES PATENTS

| | | | |
|---|---|---|---|
| 2,583,390 | 1/1952 | Paasche | 55—228 X |
| 3,233,881 | 2/1966 | Smith | 261—116 X |
| 3,321,191 | 5/1967 | Najarian | 55—256 X |
| 3,425,191 | 2/1969 | Butz | 55—256 X |

TIM R. MILES, Primary Examiner

U.S. Cl. X.R.

55—228, 256; 261—35, 122, 8